United States Patent [19]

Nakahashi

[11] Patent Number: 4,493,537
[45] Date of Patent: Jan. 15, 1985

[54] OBJECTIVE LENS SYSTEM FOR ENDOSCOPES

[75] Inventor: Kenichi Nakahashi, Hachiooji, Japan

[73] Assignee: Olympus Optical Co., Ltd., Tokyo, Japan

[21] Appl. No.: 439,293

[22] Filed: Nov. 4, 1982

[30] Foreign Application Priority Data

Nov. 10, 1981 [JP] Japan .................. 56-179027

[51] Int. Cl.³ .................. G02B 9/34; G02B 13/04
[52] U.S. Cl. .................. 350/469; 350/450
[58] Field of Search .................. 350/469, 450

[56] References Cited

U.S. PATENT DOCUMENTS 4,042,295 8/1977 Yamashita et al.
4,059,344 11/1977 Yamasita .................. 350/469
4,111,529 9/1978 Yamashita.

Primary Examiner—John K. Corbin
Assistant Examiner—Rebecca D. Gass
Attorney, Agent, or Firm—Cushman, Darby & Cushman

[57] ABSTRACT

An objective lens system for endoscopes comprising a first negative meniscus lens component, a second positive meniscus lens component, a third biconvex lens component and a fourth positive cemented doublet component consisting of a positive lens element and a negative lens element, said lens system having a superwide angle and favorably corrected aberrations, especially spherical aberration and lateral chromatic aberration.

17 Claims, 16 Drawing Figures

OBJECTIVE LENS SYSTEM FOR ENDOSCOPES

BACKGROUND OF THE INVENTION (a) Field of the Invention

The present invention relates to a wide-angle retrofocus type of objective lens system for endoscopes.

(b) Description of the Prior Art

In clinical inspection with an endoscope, it is necessary to observe or photograph a wide range of inspection area at a time so as to locate abnormal portion within the sight. For this reason, objective lens systems having wide angles are desired for endoscopes. However, the conventional objective lens systems for endoscopes had field angles of about 80° at widest. Therefore, the endoscopes using these objective lens systems permitted observing or photographing narrow ranges only at a time, required long time for clinical inspections, made patients suffer from much pain or large burden, and had rather high possibility to make abnormal portions out of sight.

In order to widen field angle of an objective lens system for endoscopes, it is generally known to design the so-called retrofocus type of lens system in which a diverging lens group and a converging lens group are arranged as the front and rear lens groups respectively. This refrofocus type of lens system has excellent features to permit locating the rear focal points apart from the final lens surface, avoiding influences due to contamination and injury on lens surface and correcting curvature of field over a wide field angle owing to a concave lens component having strong power in the front lens group.

However, when the retrofocus type of lens system having the above-described excellent features is so designed as to have such a ultra-wide angle as is mentioned as the object of the present invention, it has drawbacks. Speaking concretely of the drawbacks, the lens system allows spherical aberration and lateral chromatic aberration to be produced by the negative refractive power which is too strong in the front lens group.

SUMMARY OF THE INVENTION

A general object of the present invention is to provide a ultra-wide-angle retrofocus type of objective lens system for endoscopes comprising relatively small number of lens elements, i.e., four components of five elements, and having favorably corrected aberrations, especially spherical aberration and lateral chromatic aberration. The lens system according to the present invention has such a composition as shown in FIG. 1. Speaking concretely, the lens system comprises a first negative meniscus lens component having a convex surface on the object side, a stop, a second positive meniscus lens component, a third biconvex lens component and a fourth positive cemented doublet component consisting of a positive lens element and negative lens element. Further, the lens system according to the present invention is so designed as to satisfy the following conditions (1) through (6):

$$n_1 \geq 1.51 \tag{1}$$

$$\nu_1 \geq 55 \tag{2}$$

$$1.4 \leq \frac{f_{234}}{f} \leq 1.7 \tag{3}$$

$$1.3 \leq \left| \left( \frac{1-n_1}{r_2} \right) \Big/ \left( \frac{1-n_2}{r_5} + \frac{1-n_3}{r_7} \right) \right| \leq 1.6 \tag{4}$$

$$\nu_3 \geq 60 \tag{5}$$

$$|n_4 - n_5| \geq 0.2 \tag{6}$$

wherein the reference symbols are defined as follows:

$f$: focal length of the entire lens system as a whole $f_{234}$: total focal length of said second, third and fourth lens components as a whole $r_2$, $r_5$ and $r_7$: radii of curvature on the image side surface of said first lens component, image side surface of said second lens component and image side surface of said third lens component respectively $n_1$, $n_2$, $n_3$, $n_4$ and $n_5$: refractive indices of the respective lens elements $\nu_1$, $\nu_2$ and $\nu_3$: Abbe's numbers of said first, second and third lens components respectively In the lens system according to the present invention, the first lens component arranged in the front lens group is so designed as to have the convex surface on the object side for the purpose of allowing rays to be incident even at wide angles and widening field angle of the lens system. Further, the image side surface of the first lens component functions to minimize the diameter of the flux of the rays emerging from said first lens component, thereby making it possible to widen field angle of the lens system without enlarging the entire lens system. Since the first lens component is designed as a negative meniscus lens component, it is possible to minimize Petzval's sum and correct curvature of field over the entire range of the wide field. Moreover, aberrations such as spherical aberration and chromatic aberration can be corrected more favorably by selecting material of the first lens component so as to satisfy the conditions (1) and (2).

The condition (1) is adopted for the purpose of minimizing Petzval's sum and suppress spherical aberration. If the refractive index of the first lens component is smaller than 1.51 defined as the lower limit of the condition (1), power of the first lens component must be increased to minimize Petzval's sum and, as a result, the spherical aberration produced by this lens component is aggravated too much to be corrected favorably by the rear lens group (i.e., the second, third and fourth lens components).

The condition (2) is adopted for the purpose of minimizing chromatic aberration to be produced by the first lens component. If the Abbe's number $\nu_1$ of this lens component exceeds the lower limit of the condition (2), the chromatic aberration produced in this lens component cannot be corrected favorably by the rear lens group.

In the objective lens system according to the present invention, the aperture stop is arranged between the first lens component and the second lens component for the purpose of minimizing the angle of incidence for the rays which are incident on the image guide composed of optical fibers after passing through the fourth lens component. In other words, the aperture stop is arranged in the vicinity of the object side focal point of the rear lens group to make the rays passed through the rear lens group nearly parallel to the optical axis. In a lens system having such a composition as that of the lens system according to the present invention, the object side focal point of the rear lens group is located between the first lens component and the second lens component. Therefore, arranging the stop at the position described above makes it possible to minimize angle of incidence for the rays incident on the image guide composed of optical fibers, thereby assuring high transmission characteristic for the rays transmitted by the image guide.

The condition (3) is adopted mainly for correcting curvature of field and coma. If $f_{234}/f$ exceeds the upper limit of the condition (3), the distance between the conjugate points of the rear lens group is prolonged in proportion to focal length, thereby prolonging total length of the entire lens system. It is therefore impossible to satisfy the requirement of compact design necessary for an objective lens system for endoscopes. If $f_{234}/f$ is smaller than the lower limit of the condition (3), in contrast, the total focal length of the rear lens group will be shortened and, so far as height of the incident rays is kept constant, the rear lens group will have a larger field angle, thereby aggravating curvature of field and coma.

The condition (4) is adopted mainly for minimizing spherical aberration. Speaking concretely, in a wide-angle objective lens system as that according to the present invention, the image side surface of the first lens component must have strong refractive power for the purpose of thinning the flux of rays having passed through the rear lens group as already described above. When said surface has a strong refractive power, however, it will produce spherical aberration. The condition (4) is effective to correct the spherical aberration. If the lower limit of the condition (4) is exceeded, spherical aberration will be overcorrected by the rear lens group. If the upper limit of the condition (4) is exceeded, in contrast, the spherical aberration will be undercorrected. It is therefore impossible to balance the spherical aberration properly unless the condition (4) is satisfied.

The conditions (5) and (6) are necessary mainly for correcting lateral chromatic aberration. In a wide-angle objective lens system for endoscopes so as that according to the present invention, lateral chromatic aberration is produced remarkably. The condition (5) serves for suppressing production of lateral chromatic aberration in the second lens component and the third lens component which are designed as single-element lenses. If the condition (5) is not satisfied, it will be impossible to favorably correct the chromatic aberration produced remarkably in the second and third lens components.

Even when the lens system is so designed as to satisfy the conditions (2) and (5), it is difficult to suppress production of chromatic aberration. In order to correct the chromatic aberration, the fourth lens component is designed as a cemented doublet and the difference in refractive index between both the lens elements is selected as defined by the condition (6) so that lateral chromatic aberration will be minimized even at a wide angle. If the condition (6) is not satisfied, lateral chromatic aberration will be aggravated.

DETAILED DESCRIPTION OF THE PREFERRED EMBODIMENTS

Figure 1:
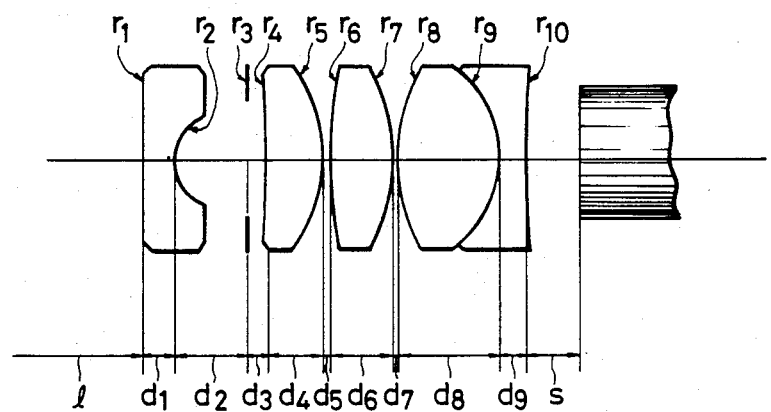
FIG. 1 shows a sectional view illustrating the composition of the objective lens system for endoscopes according to the present invention.
Figure 2:
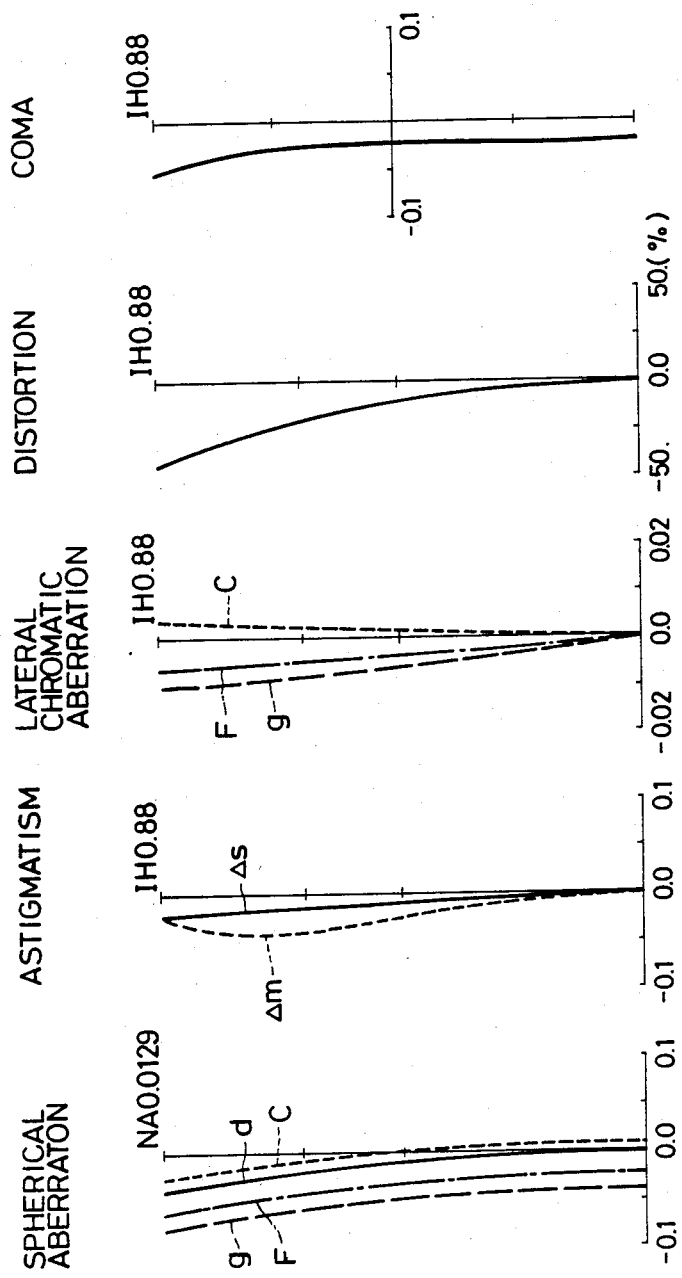
FIG. 2 through FIG. 16 show graphs illustrating aberration characteristics of Embodiments 1 through 15 of the objective lens system according to the present invention.
Figure 3:
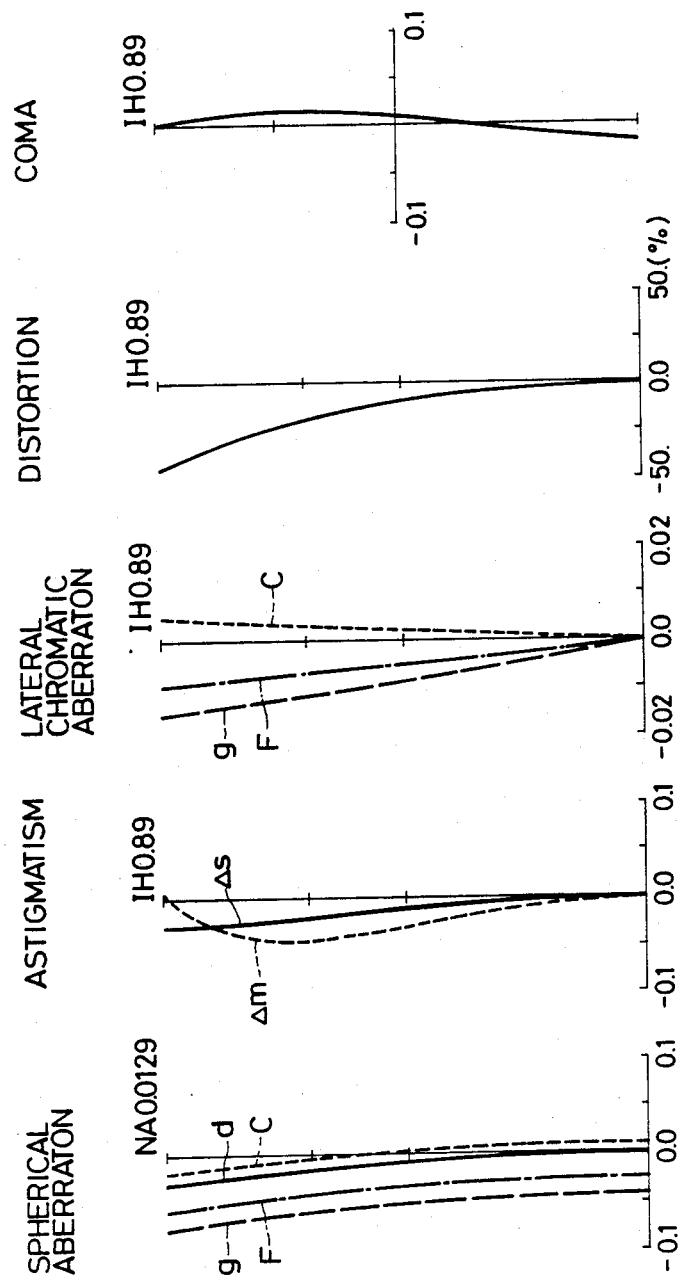
Figure 4:
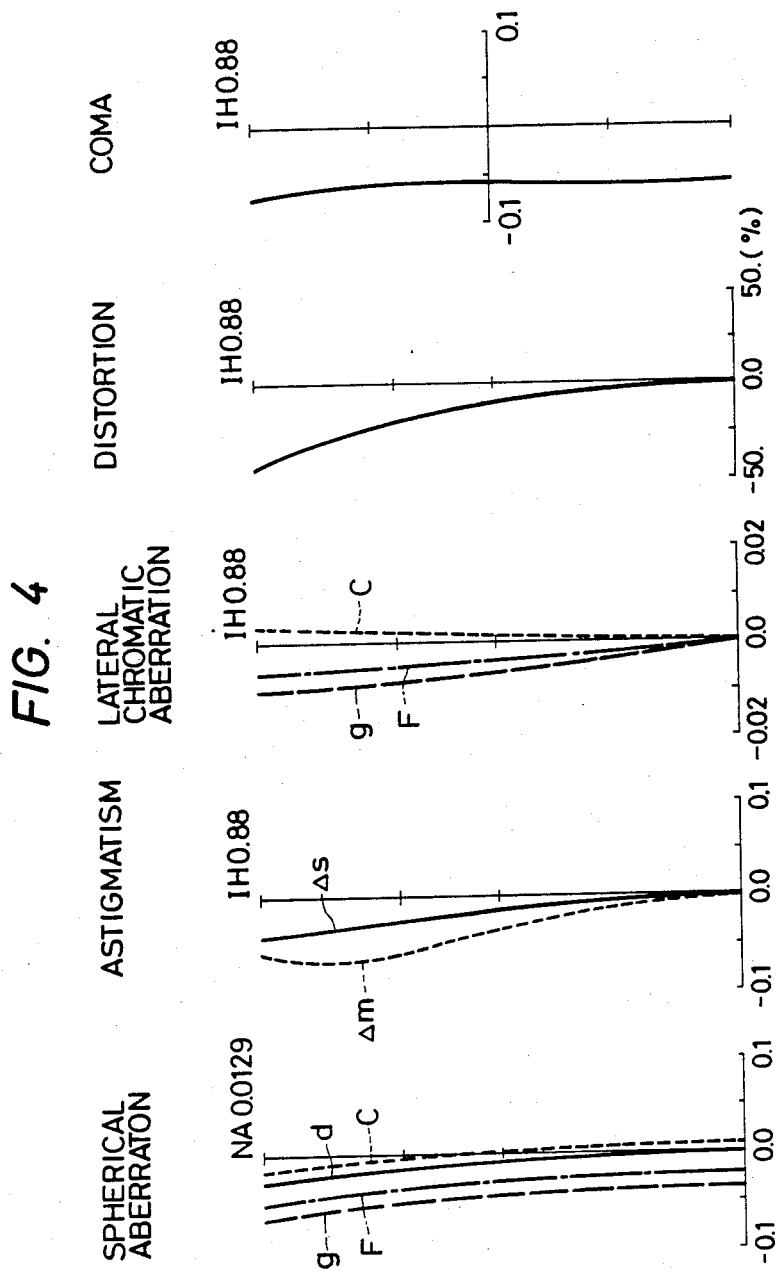
Figure 5:
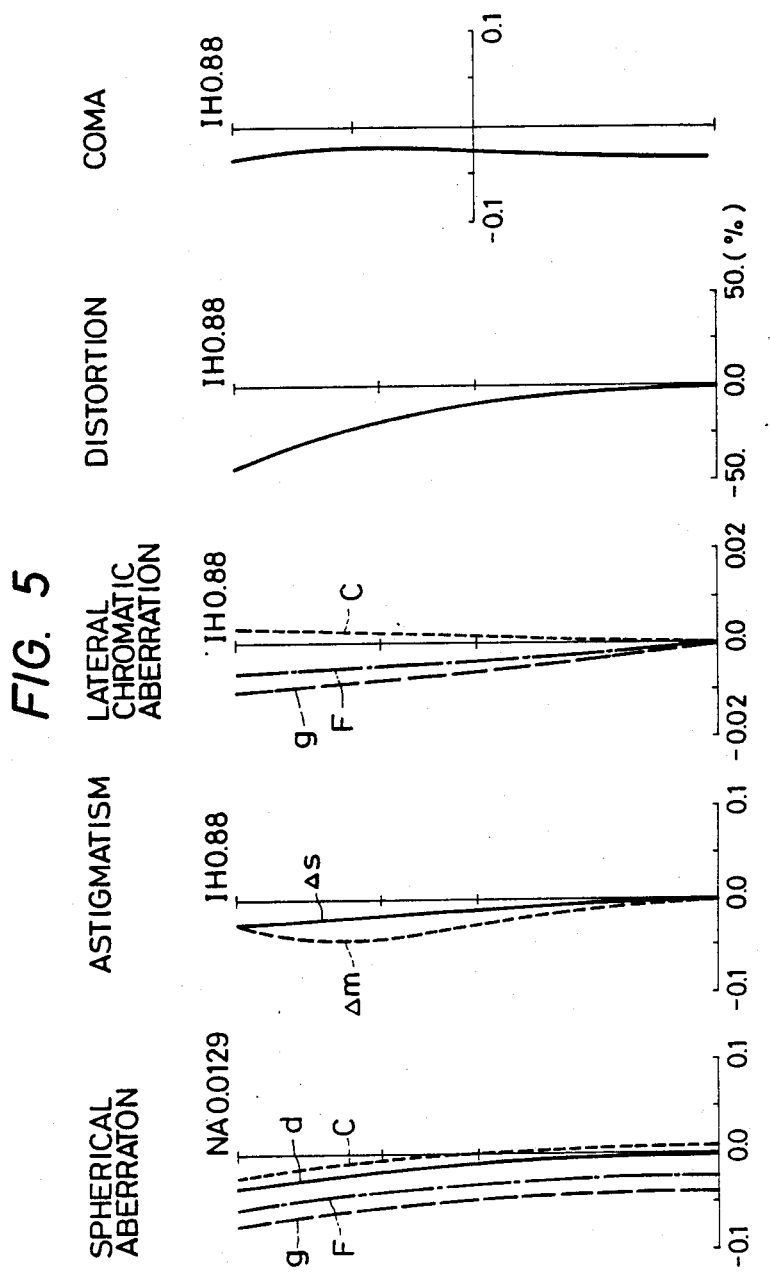
Figure 6:
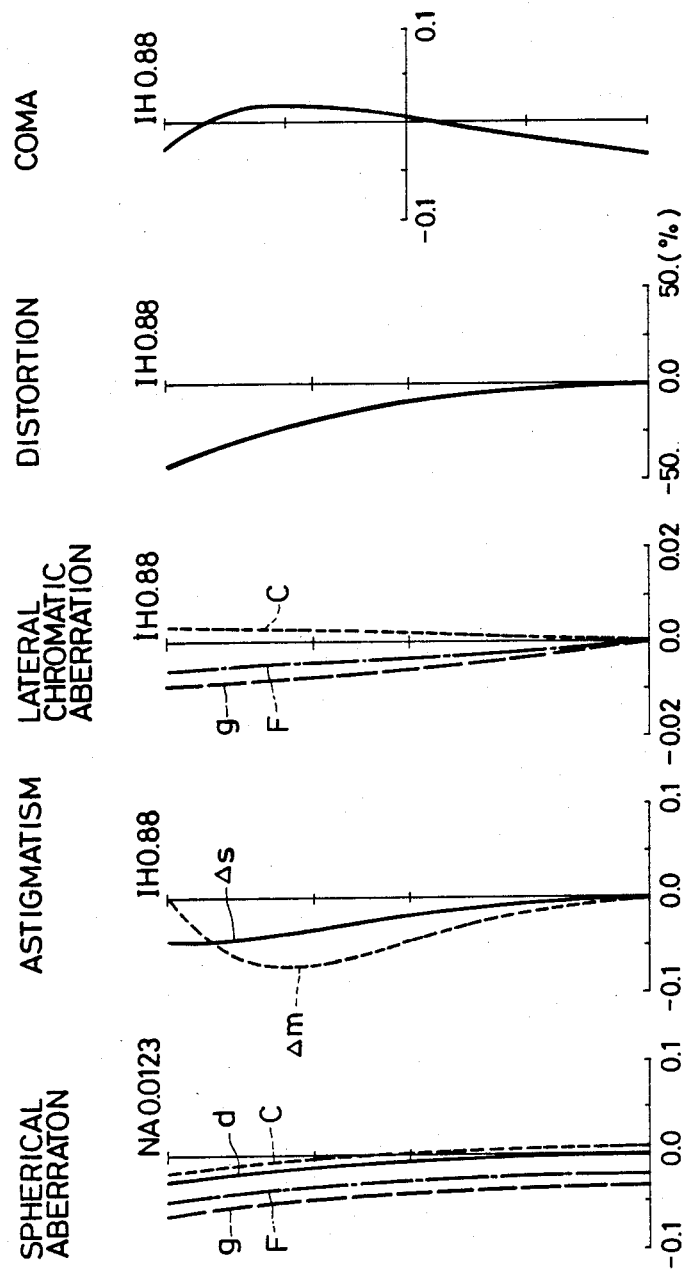
Figure 7:
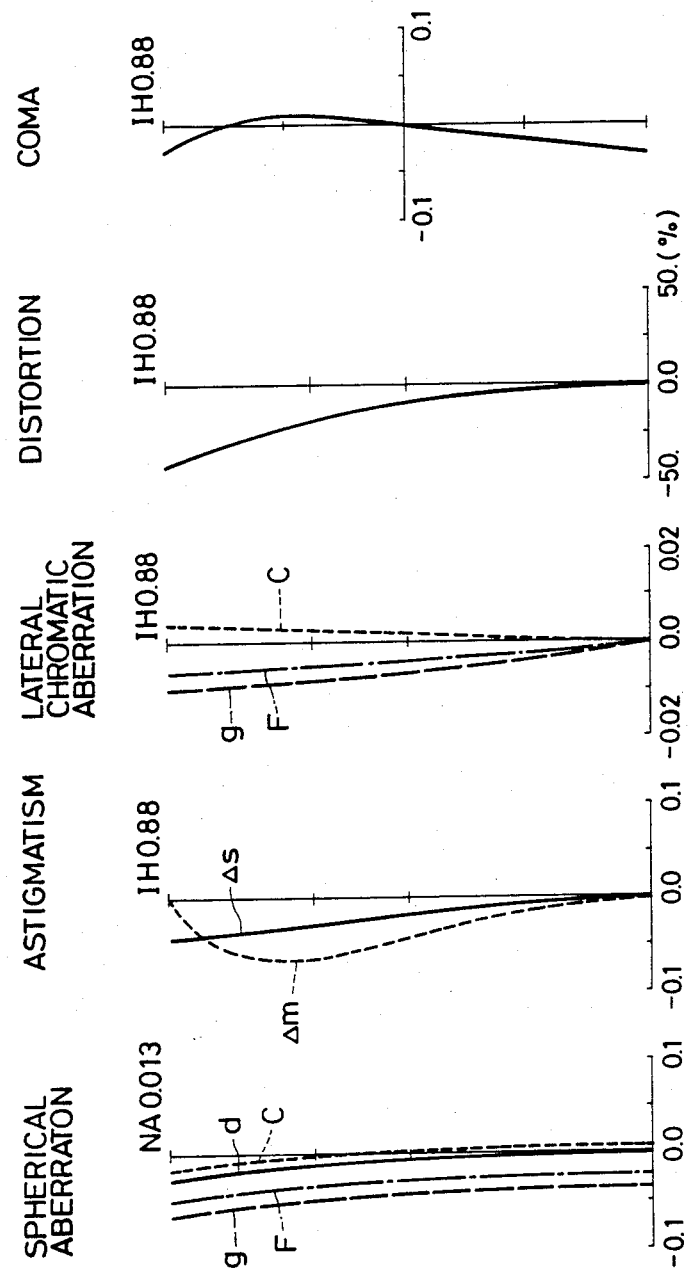
Figure 8:
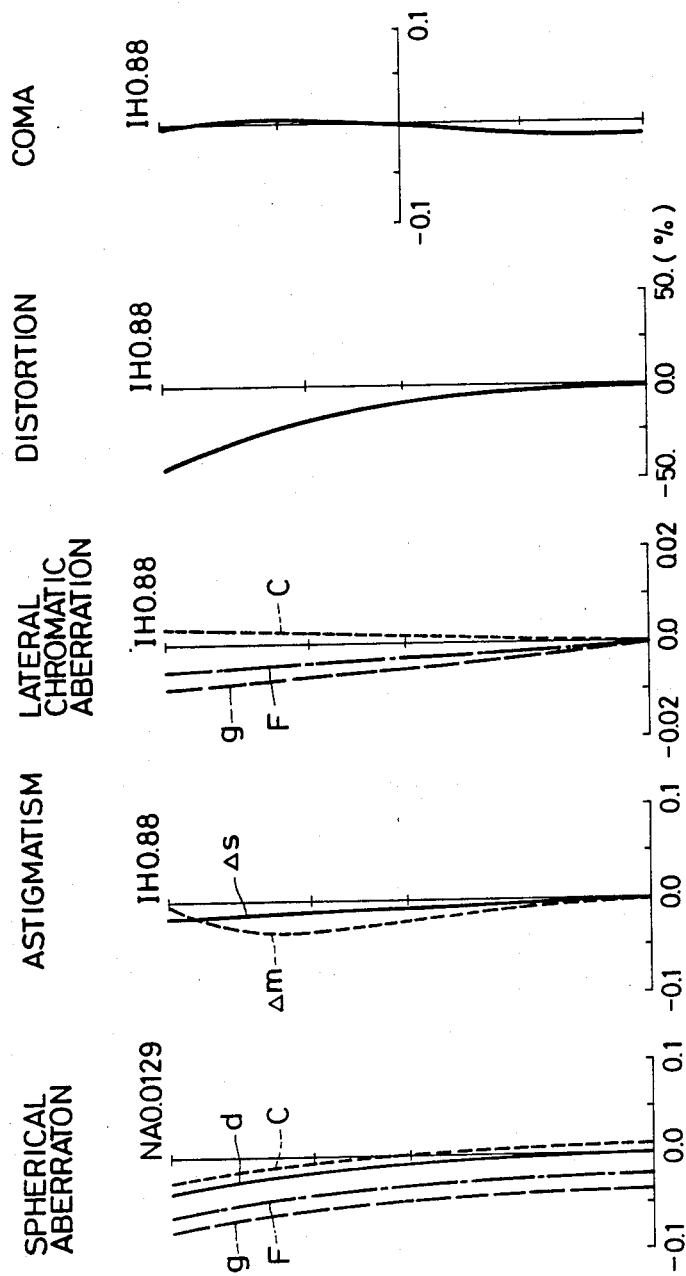
Figure 9:
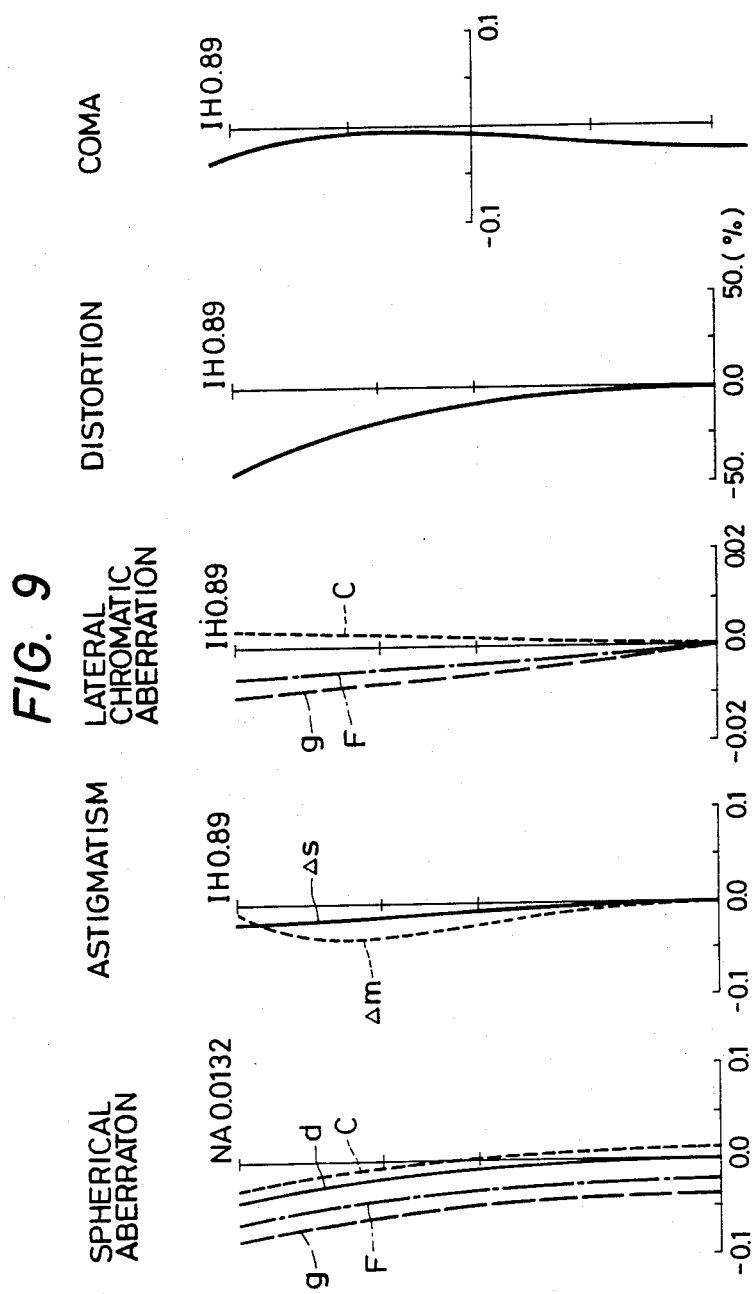
Figure 10:
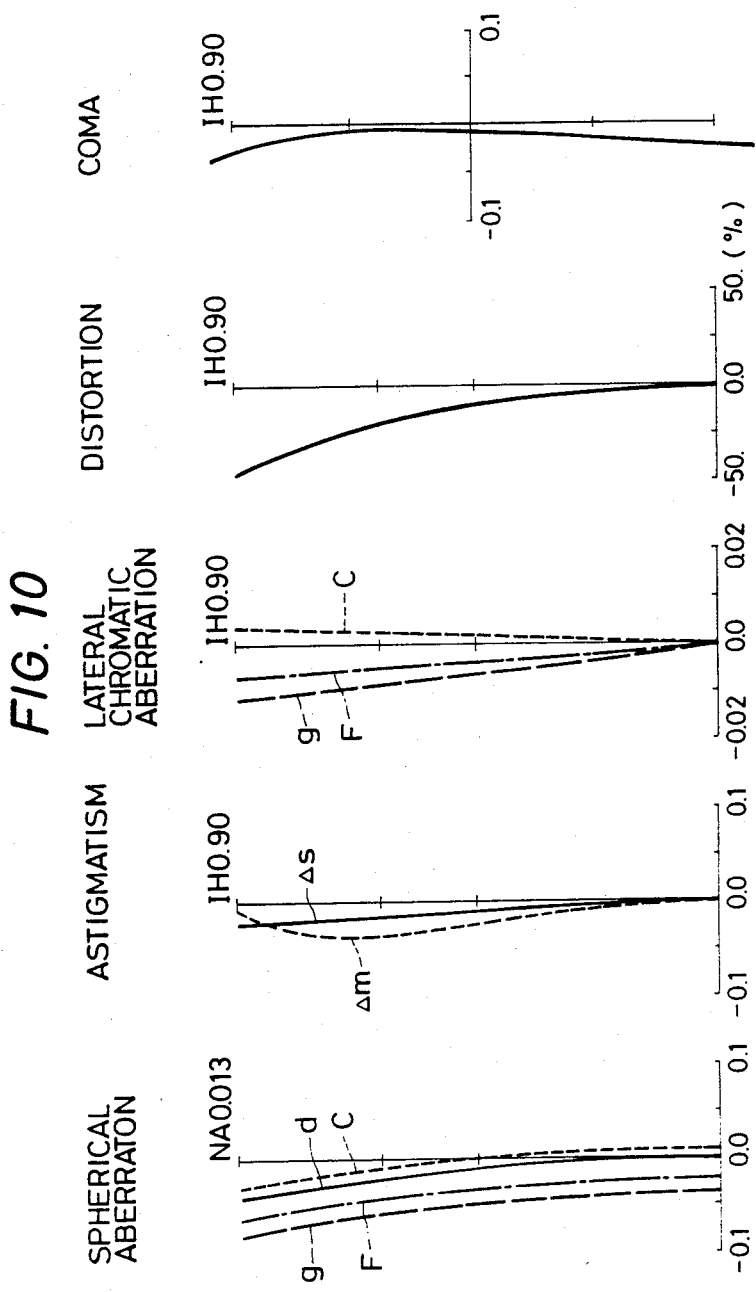
Figure 11:
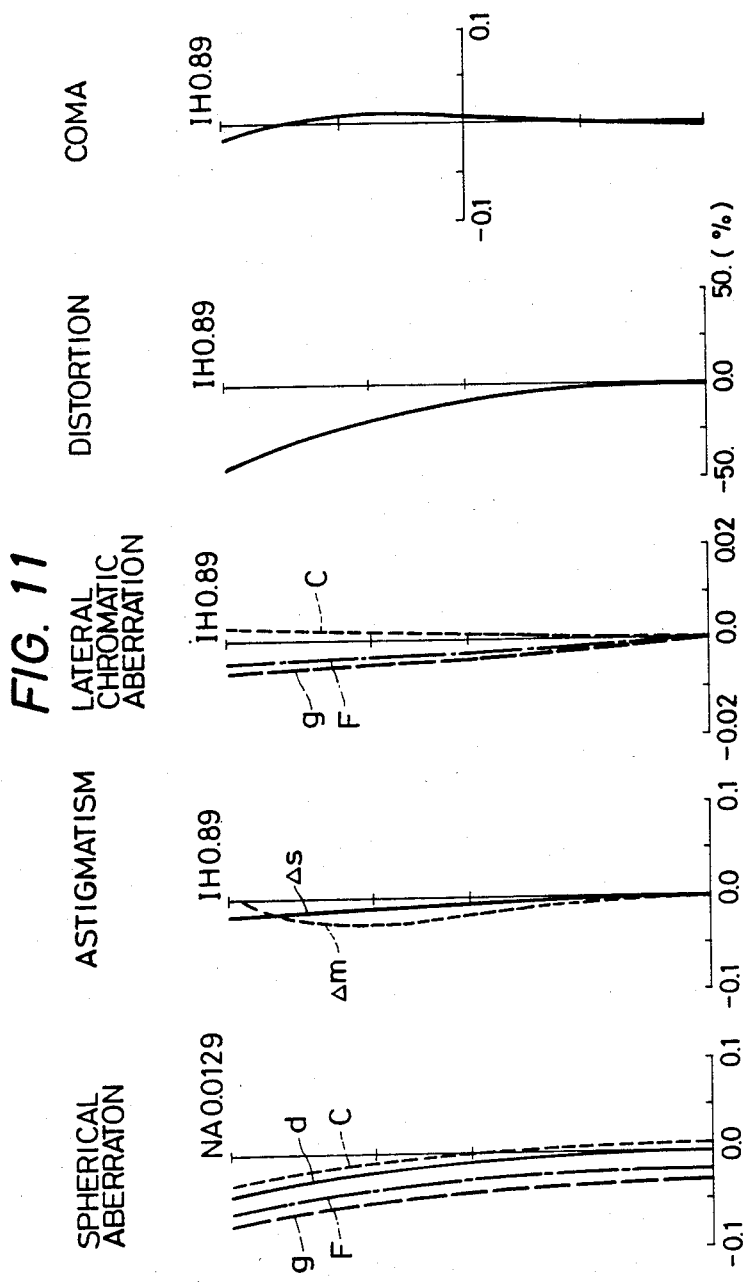
Figure 12:
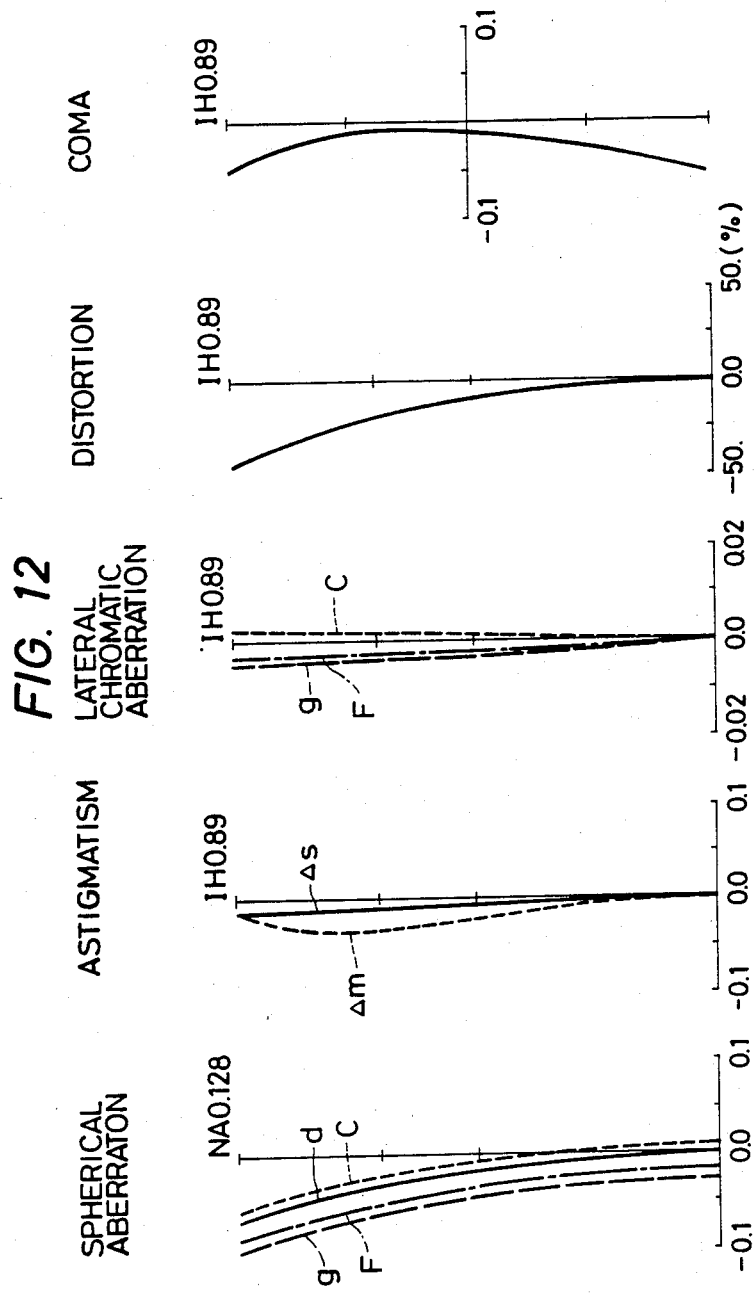
Figure 13:
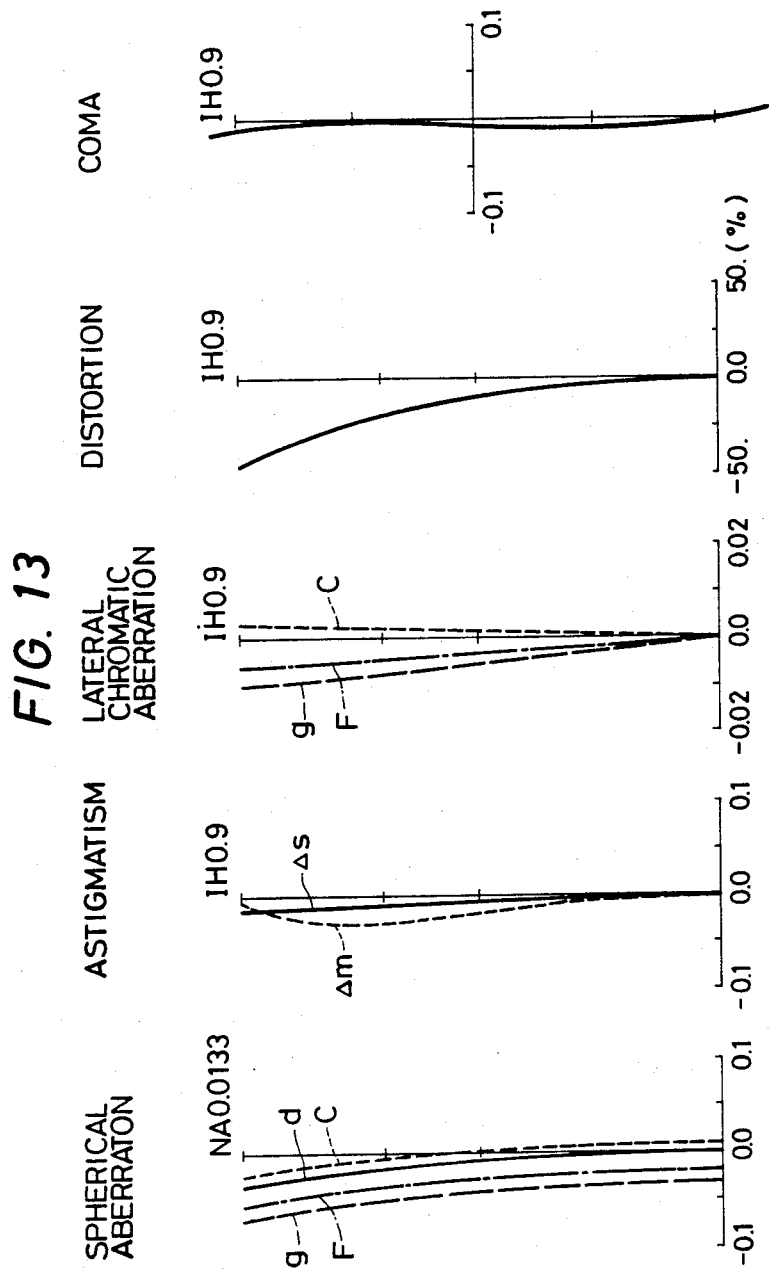
Figure 14:
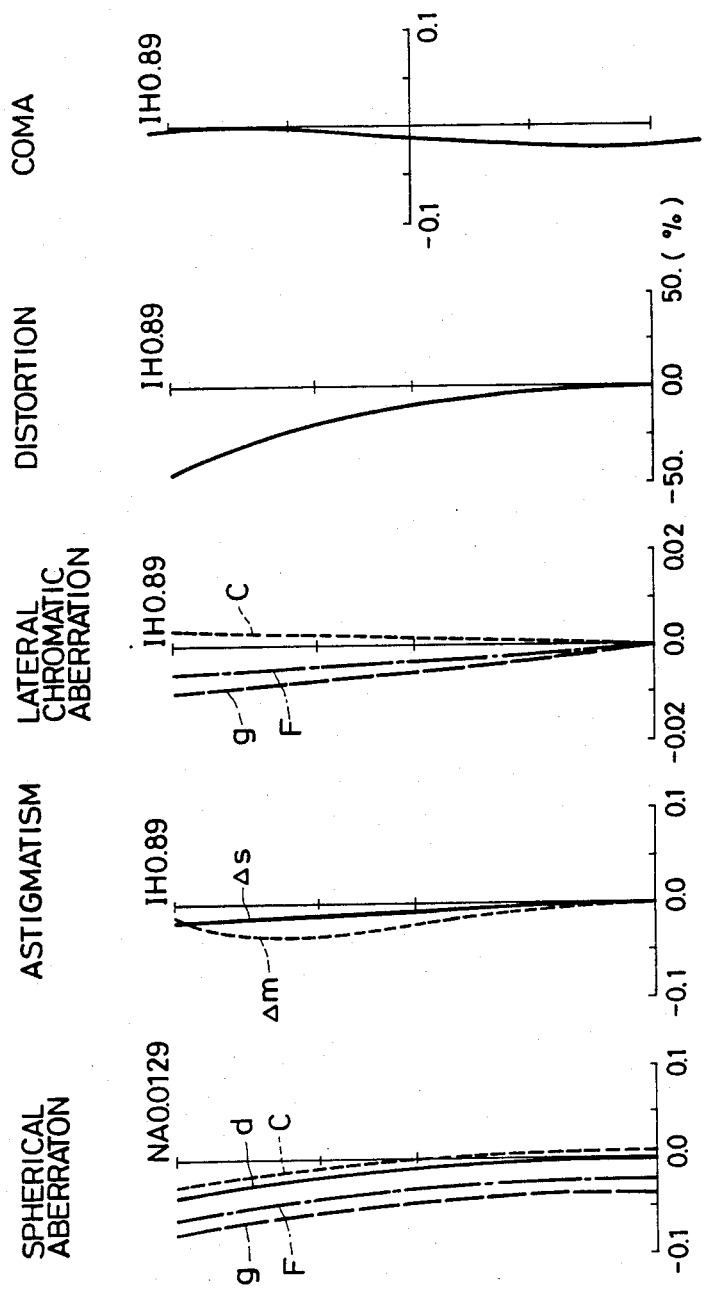
Figure 15:
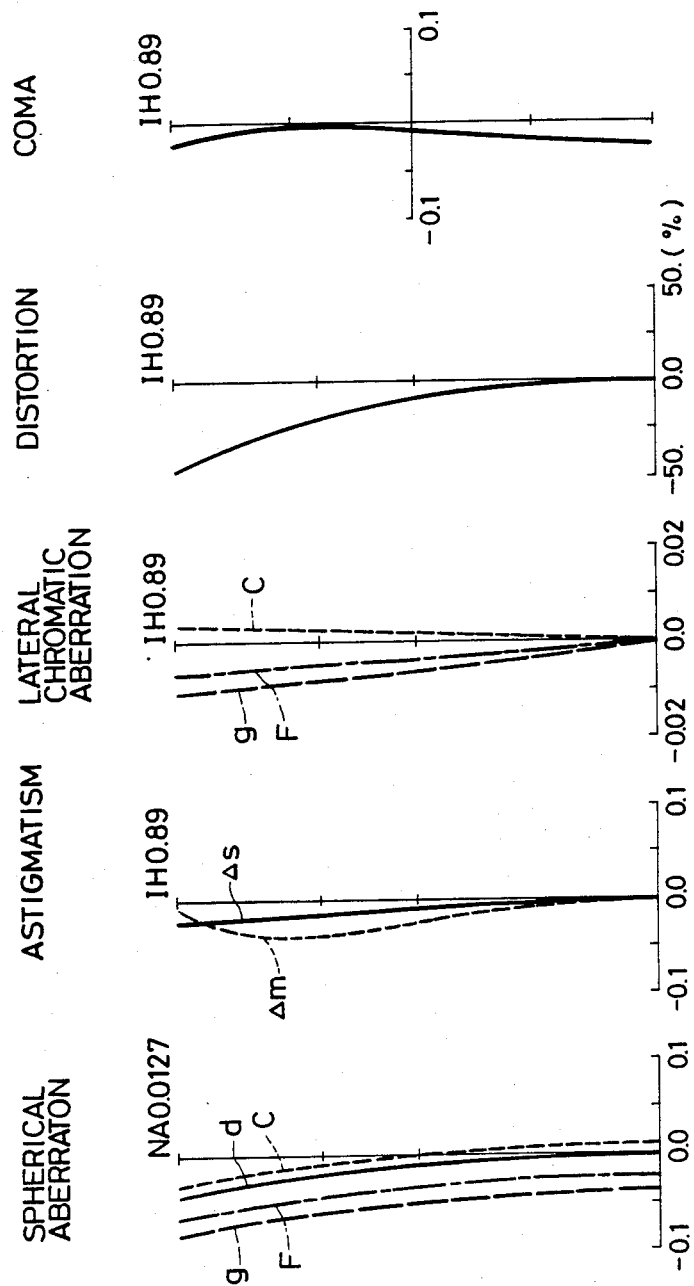
Figure 16:
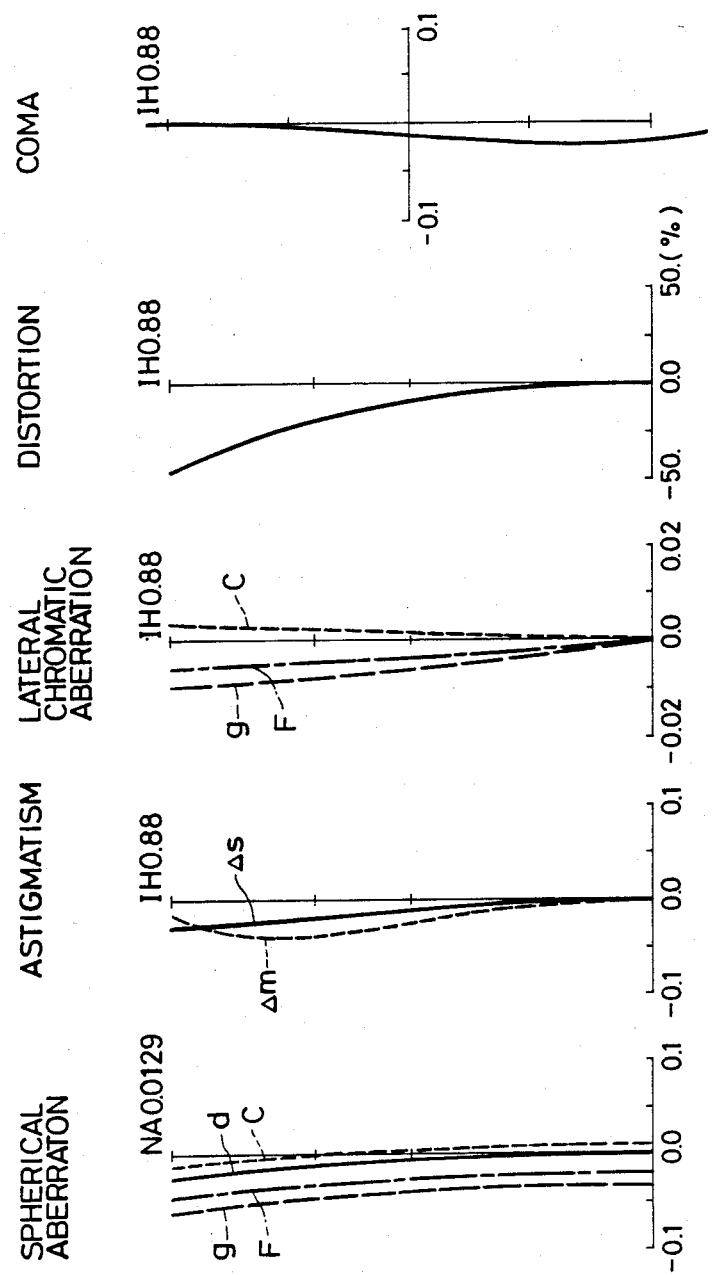

Now, numerical data of the objective lens system for endoscopes will be described below as preferred embodiments of the present invention:

Embodiment 1

$r_1 = 40.340$
$\quad d_1 = 0.509 \quad n_1 = 1.58913 \quad \nu_1 = 60.97$
$r_2 = 0.844$
$\quad d_2 = 1.253$
$r_3 = \infty$ (stop)
$\quad d_3 = 0.372$
$r_4 = -35.462$
$\quad d_4 = 1.067 \quad n_2 = 1.69680 \quad \nu_2 = 55.52$
$r_5 = -2.318$
$\quad d_5 = 0.124$
$r_6 = 9.484$
$\quad d_6 = 1.129 \quad n_3 = 1.51728 \quad \nu_3 = 69.56$
$r_7 = -2.955$
$\quad d_7 = 0.124$
$r_8 = 2.782$
$\quad d_8 = 1.948 \quad n_4 = 1.61800 \quad \nu_4 = 63.38$
$r_9 = -1.608$
$\quad d_9 = 0.434 \quad n_5 = 1.84666 \quad \nu_5 = 23.90$
$r_{10} = -49.305$
$f = 1.0, 1 = 15.0, S = 0.81$
$IH = 0.881, 2\omega = 115.84°, \Sigma p = -0.014$
$NA = 0.0129, f_{234}/f = 1.614$ $$\left| \left( \frac{1 - n_1}{r_2} \right) / \left( \frac{1 - n_2}{r_5} + \frac{1 - n_3}{r_7} \right) \right| = 1.467$$

Embodiment 2

$r_1 = 28.7611$
$\quad d_1 = 0.4938 \quad n_1 = 1.58913 \quad \nu_1 = 60.97$
$r_2 = 0.8457$
$\quad d_2 = 0.9877$
$r_3 = \infty$ (stop)
$\quad d_3 = 0.6173$
$r_4 = -99.2330$
$\quad d_4 = 1.0494 \quad n_2 = 1.6968 \quad \nu_2 = 55.52$
$r_5 = -2.1786$
$\quad d_5 = 0.1235$
$r_6 = 9.2568$
$\quad d_6 = 1.1111 \quad n_3 = 1.6968 \quad \nu_3 = 55.52$
$r_7 = -4.4531$
$\quad d_7 = 0.1235$
$r_8 = 3.0441$
$\quad d_8 = 1.7284 \quad n_4 = 1.6180 \quad \nu_4 = 63.38$
$r_9 = -1.6506$
$\quad d_9 = 0.4321 \quad n_5 = 1.84666 \quad \nu_5 = 23.90$
$r_{10} = -18.0296$
$f = 1.0, 1 = 15.0, S = 0.863$
$IH = 0.889, 2\omega = 117.08°, \Sigma P = 0$
$NA = 0.0129, f_{234}/f = 1.591$ $$\left| \left( \frac{1 - n_1}{r_2} \right) / \left( \frac{1 - n_2}{r_5} + \frac{1 - n_3}{r_7} \right) \right| = 1.463$$

Embodiment 3

$r_1 = 20.6504$
$\quad d_1 = 0.5001 \quad n_1 = 1.58913 \quad \nu_1 = 60.97$
$r_2 = 0.8479$
$\quad d_2 = 1.2476$
$r_3 = \infty$ (stop)
$\quad d_3 = 0.3770$
$r_4 = -63.1598$
$\quad d_4 = 1.0635 \quad n_2 = 1.69680 \quad \nu_2 = 55.52$
$r_5 = -2.4379$
$\quad d_5 = 0.1251$
$r_6 = 7.2310$
$\quad d_6 = 1.1253 \quad n_3 = 1.51728 \quad \nu_3 = 69.56$
$r_7 = -3.0381$
$\quad d_7 = 0.1255$
$r_8 = 2.6453$ -continued $$d_8 = 1.8743 \quad n_4 = 1.61800 \quad \nu_4 = 63.38$$
$$r_9 = -1.6289$$
$$d_9 = 0.4375 \quad n_5 = 1.84666 \quad \nu_5 = 23.90$$
$$r_{10} = -812.0951$$
f = 1.0, l = 15.0, S = 0.773
IH = 0.881, 2ω = 115.57°, ΣP = 0
NA = 0.0129, $f_{234}/f$ = 1.587

$$\left| \left( \frac{1 - n_1}{r_2} \right) \bigg/ \left( \frac{1 - n_2}{r_5} + \frac{1 - n_3}{r_7} \right) \right| = 1.523$$

Embodiment 4

$$r_1 = 21.3790$$
$$d_1 = 0.5062 \quad n_1 = 1.58913 \quad \nu_1 = 60.97$$
$$r_2 = 0.8417$$
$$d_2 = 1.2469$$
$$r_3 = \infty \text{ (stop)}$$
$$d_3 = 0.3704$$
$$r_4 = -35.9354$$
$$d_4 = 1.0617 \quad n_2 = 1.69680 \quad \nu_2 = 55.52$$
$$r_5 = -2.2956$$
$$d_5 = 0.1246$$
$$r_6 = 8.7810$$
$$d_6 = 1.1235 \quad n_3 = 1.51728 \quad \nu_3 = 69.56$$
$$r_7 = -3.0240$$
$$d_7 = 0.1235$$
$$r_8 = 2.6730$$
$$d_8 = 1.8765 \quad n_4 = 1.61800 \quad \nu_4 = 63.38$$
$$r_9 = -1.6290$$
$$d_9 = 0.4321 \quad n_5 = 1.84666 \quad \nu_5 = 23.90$$
$$r_{10} = -206.3722$$
f = 1.0, l = 15.0, S = 0.794
IH = 0.881, 2ω = 114.86°, ΣP = -0.006
NA = 0.0129, $f_{234}/f$ = 1.589

$$\left| \left( \frac{1 - n_1}{r_2} \right) \bigg/ \left( \frac{1 - n_2}{r_5} + \frac{1 - n_3}{r_7} \right) \right| = 1.475$$

Embodiment 5

$$r_1 = 17.6741$$
$$d_1 = 0.4938 \quad n_1 = 1.58913 \quad \nu_1 = 60.97$$
$$r_2 = 0.8373$$
$$d_2 = 0.9877$$
$$r_3 = \infty \text{ (stop)}$$
$$d_3 = 0.6173$$
$$r_4 = -36.3478$$
$$d_4 = 1.0494 \quad n_2 = 1.69680 \quad \nu_2 = 55.52$$
$$r_5 = -2.4411$$
$$d_5 = 0.1246$$
$$r_6 = 6.5303$$
$$d_6 = 1.0864 \quad n_3 = 1.48749 \quad \nu_3 = 70.15$$
$$r_7 = -2.8037$$
$$d_7 = 0.1235$$
$$r_8 = 2.5290$$
$$d_8 = 1.7284 \quad n_4 = 1.61800 \quad \nu_4 = 63.38$$
$$r_9 = -1.5909$$
$$d_9 = 0.4321 \quad n_5 = 1.84666 \quad \nu_5 = 23.90$$
$$r_{10} = 89.7642$$
f = 1.0, l = 15.0, S = 0.863
IH = 0.881, 2ω = 115.53°, ΣP = 0
NA = 0.0129, $f_{234}/f$ = 1.574

$$\left| \left( \frac{1 - n_1}{r_2} \right) \bigg/ \left( \frac{1 - n_2}{r_5} + \frac{1 - n_3}{r_7} \right) \right| = 1.532$$

Embodiment 6

$$r_1 = 20.3968$$
$$d_1 = 0.4938 \quad n_1 = 1.58913 \quad \nu_1 = 60.97$$
$$r_2 = 0.8374$$
$$d_2 = 0.9877$$
$$r_3 = \infty \text{ (stop)}$$
$$d_3 = 0.6173$$
$$r_4 = -62.3951$$
$$d_4 = 1.0494 \quad n_2 = 1.6968 \quad \nu_2 = 55.52$$
$$r_5 = -2.4077$$
$$d_5 = 0.1235$$
$$r_6 = 7.1414$$
$$d_6 = 1.1110 \quad n_3 = 1.51728 \quad \nu_3 = 69.56$$
$$r_7 = -3.0005$$
$$d_7 = 0.1236$$
$$r_8 = 2.6126$$
$$d_8 = 1.7284 \quad n_4 = 1.61800 \quad \nu_4 = 63.38$$
$$r_9 = -1.6088$$
$$d_9 = 0.4321 \quad n_5 = 1.84666 \quad \nu_5 = 23.90$$
$$r_{10} = -796.822$$
f = 1, l = 15.0, S = 0.863
IH = 0.0881, 2ω = 115.71°, ΣP = 0
NA = 0.013, $f_{234}/f$ = 1.584

$$\left| \left( \frac{1 - n_1}{r_2} \right) \bigg/ \left( \frac{1 - n_2}{r_5} + \frac{1 - n_3}{r_7} \right) \right| = 1.523$$

Embodiment 7

$$r_1 = 46.5568$$
$$d_1 = 0.5043 \quad n_1 = 1.58913 \quad \nu_1 = 60.97$$
$$r_2 = 0.8358$$
$$d_2 = 1.2423$$
$$r_3 = \infty \text{ (stop)}$$
$$d_3 = 0.3690$$
$$r_4 = -39.4208$$
$$d_4 = 1.0578 \quad n_2 = 1.6968 \quad \nu_2 = 55.52$$
$$r_5 = -2.2932$$
$$d_5 = 0.1230$$
$$r_6 = 8.9076$$
$$d_6 = 1.1193 \quad n_3 = 1.5728 \quad \nu_3 = 69.56$$
$$r_7 = -2.9702$$
$$d_7 = 0.1230$$
$$r_8 = 2.7349$$
$$d_8 = 1.8696 \quad n_4 = 1.61800 \quad \nu_4 = 63.38$$
$$r_9 = -1.5664$$
$$d_9 = 0.4305 \quad n_5 = 1.84666 \quad \nu_5 = 23.90$$
$$r_{10} = -363.0739$$
f = 1.0, l = 15.0, S = 0.838
IH = 0.881, 2ω = 115.646°, ΣP = -0.022
NA = 0.0129, $f_{234}/f$ = 1.53

$$\left| \left( \frac{1 - n_1}{r_2} \right) \bigg/ \left( \frac{1 - n_2}{r_5} + \frac{1 - n_3}{r_7} \right) \right| = 1.419$$

Embodiment 8

$$r_1 = 75.582$$
$$d_1 = 0.523 \quad n_1 = 1.58913 \quad \nu_1 = 60.97$$
$$r_2 = 0.872$$
$$d_2 = 1.264$$
$$r_3 = \infty \text{ (stop)}$$
$$d_3 = 0.376$$
$$r_4 = -31.949$$
$$d_4 = 1.076 \quad n_2 = 1.69680 \quad \nu_2 = 55.52$$
$$r_5 = -2.309$$
$$d_5 = 0.125$$
$$r_6 = 10.102$$
$$d_6 = 1.139 \quad n_3 = 1.51728 \quad \nu_3 = 69.56$$
$$r_7 = -2.963$$
$$d_7 = 0.125$$
$$r_8 = 2.737$$
$$d_8 = 1.965 \quad n_4 = 1.6180 \quad \nu_4 = 63.38$$
$$r_9 = -1.602$$
$$d_9 = 0.439 \quad n_5 = 1.84666 \quad \nu_5 = 23.90$$
$$r_{10} = -72.703$$
f = 1.0, l = 15.0, S = 0.78
IH = 0.888, 2ω = 117.85°, ΣP = -0.009
NA = 0.0132, $f_{234}/f$ = 1.563

$$\left| \left( \frac{1 - n_1}{r_2} \right) \bigg/ \left( \frac{1 - n_2}{r_5} + \frac{1 - n_3}{r_7} \right) \right| = 1.418$$

Embodiment 9

$$r_1 = 76.346$$
$$d_1 = 0.5277 \quad n_1 = 1.58913 \quad \nu_1 = 60.97$$
$$r_2 = 0.880$$

-continued

```
        d₂ = 1.2771
r₃ = ∞ (stop)
        d₃ = 0.38
r₄ = −31.030
        d₄ = 1.0872    n₂ = 1.670      ν₂ = 57.33
r₅ = −2.242
        d₅ = 0.1010
r₆ = 10.204
        d₆ = 1.1505    n₃ = 1.51728    ν₃ = 69.56
r₇ = −2.993
        d₇ = 0.1010
r₈ = 2.764
        d₈ = 2.0202    n₄ = 1.618      ν₄ = 63.38
r₉ = −1.618
        d₉ = 0.4433    n₅ = 1.84666    ν₅ = 23.90
r₁₀ = −73.4376
f = 1.0, l = 15.0, S = 0.762
IH = 0.899, 2ω = 120.19°, ΣP = −0.006
NA = 0.013, f₂₃₄/f = 1.612
```

$$\left| \left( \frac{1 - n_1}{r_2} \right) \Big/ \left( \frac{1 - n_2}{r_5} + \frac{1 - n_3}{r_7} \right) \right| = 1.419$$

Embodiment 10

```
r₁ = 75.582
        d₁ = 0.523     n₁ = 1.58913    ν₁ = 60.97
r₂ = 0.872
        d₂ = 1.264
r₃ = ∞ (stop)
        d₃ = 0.376
r₄ = −31.949
        d₄ = 1.076     n₂ = 1.6968     ν₂ = 55.52
r₅ = −2.309
        d₅ = 0.125
r₆ = 10.102
        d₆ = 1.139     n₃ = 1.51728    ν₃ = 69.56
r₇ = −2.963
        d₇ = 0.125
r₈ = 3.074
        d₈ = 1.965     n₄ = 1.69249    ν₄ = 58.56
r₉ = −1.602
        d₉ = 0.439     n₅ = 1.92286    ν₅ = 21.29
r₁₀ = −36.333
f = 1.0, l = 15.0, S = 0.853
IH = 0.89, 2ω = 117.6°, ΣP = −0.005
NA = 0.0129, f₂₃₄/f = 1.583
```

$$\left| \left( \frac{1 - n_1}{r_2} \right) \Big/ \left( \frac{1 - n_2}{r_5} + \frac{1 - n_3}{r_7} \right) \right| = 1.418$$

Embodiment 11

```
r₁ = 80.059
        d₁ = 0.523     n₁ = 1.726      ν₁ = 53.56
r₂ = 0.945
        d₂ = 1.264
r₃ = ∞ (stop)
        d₃ = 0.376
r₄ = −30.452
        d₄ = 1.076     n₂ = 1.6968     ν₂ = 55.52
r₅ = −2.227
        d₅ = 0.126
r₆ = 12.588
        d₆ = 1.139     n₃ = 1.51728    ν₃ = 69.56
r₇ = −2.878
        d₇ = 0.126
r₈ = 3.426
        d₈ = 1.965     n₄ = 1.69249    ν₄ = 58.56
r₉ = −1.557
        d₉ = 0.439     n₅ = 1.92286    ν₅ = 21.29
r₁₀ = −36.333
f = 1.0, l = 15.0, S = 1.05
IH = 0.89, 2ω = 116.69°, ΣP = −0.036
NA = 0.0128, f₂₃₄/f = 1.666
```

$$\left| \left( \frac{1 - n_1}{r_2} \right) \Big/ \left( \frac{1 - n_2}{r_5} + \frac{1 - n_3}{r_7} \right) \right| = 1.560$$

Embodiment 12

```
r₁ = 39.261
        d₁ = 0.45      n₁ = 1.58913    ν₁ = 60.97
r₂ = 0.834
        d₂ = 1.28
r₃ = ∞ (stop)
        d₃ = 0.38
r₄ = −33.554
        d₄ = 1.05      n₂ = 1.6968     ν₂ = 55.52
r₅ = −2.325
        d₅ = 0.1
r₆ = 10.771
        d₆ = 1.06      n₃ = 1.51728    ν₃ = 69.56
r₇ = −2.962
        d₇ = 0.1
r₈ = 2.907
        d₈ = 1.85      n₄ = 1.6180     ν₄ = 63.38
r₉ = −1.659
        d₉ = 0.44      n₅ = 1.84666    ν₅ = 23.90
r₁₀ = −22.0281
f = 1.0, l = 15.0, S = 0.986
IH = 0.9, 2ω = 118°, ΣP = −0.018
NA = 0.0133, f₂₃₄/f = 1.651
```

$$\left| \left( \frac{1 - n_1}{r_2} \right) \Big/ \left( \frac{1 - n_2}{r_5} + \frac{1 - n_3}{r_7} \right) \right| = 1.489$$

Embodiment 13

```
r₁ = 53.309
        d₁ = 0.444     n₁ = 1.58913    ν₁ = 60.97
r₂ = 0.833
        d₂ = 1.262
r₃ = ∞ (stop)
        d₃ = 0.375
r₄ = −31.892
        d₄ = 1.036     n₂ = 1.6968     ν₂ = 55.52
r₅ = −2.305
        d₅ = 0.099
r₆ = 10.489
        d₆ = 1.045     n₃ = 1.51728    ν₃ = 69.56
r₇ = −2.934
        d₇ = 0.099
r₈ = 2.852
        d₈ = 1.825     n₄ = 1.6180     ν₄ = 63.38
r₉ = −1.638
        d₉ = 0.434     n₅ = 1.84666    ν₅ = 23.90
r₁₀ = −22.031
f = 1.0, l = 15.0, S = 0.974
IH = 0.89, 2ω = 118.0°, ΣP = −0.016
NA = 0.0129, f₂₃₄/f = 1.630
```

$$\left| \left( \frac{1 - n_1}{r_2} \right) \Big/ \left( \frac{1 - n_2}{r_5} + \frac{1 - n_3}{r_7} \right) \right| = 1.478$$

Embodiment 14

```
r₁ = 87.350
        d₁ = 0.523     n₁ = 1.58913    ν₁ = 60.97
r₂ = 0.871
        d₂ = 1.264
r₃ = ∞ (stop)
        d₃ = 0.376
r₄ = −34.593
        d₄ = 1.076     n₂ = 1.6968     ν₂ = 55.52
r₅ = −2.281
        d₅ = 0.125
r₆ = 11.081
        d₆ = 1.080     n₃ = 1.48749    ν₃ = 70.15
r₇ = −2.839
        d₇ = 0.120
r₈ = 2.693
        d₈ = 1.965     n₄ = 1.6180     ν₄ = 63.38
r₉ = −1.604
        d₉ = 0.439     n₅ = 1.84666    ν₅ = 23.90
r₁₀ = −62.149
f = 1.0, l = 15.0, S = 0.794
IH = 0.89, 2ω = 118.58°, ΣP = −0.007
```

NA = 0.0127, f₂₃₄/f = 1.610

$$\left|\left(\frac{1-n_1}{r_2}\right)/\left(\frac{1-n_2}{r_5}+\frac{1-n_3}{r_7}\right)\right| = 1.420$$

Embodiment 15

$r_1 = 42.483$
$\quad d_1 = 0.423 \quad n_1 = 1.51633 \quad \nu_1 = 64.15$
$r_2 = 0.809$
$\quad d_2 = 1.259$
$r_3 = \infty$ (stop)
$\quad d_3 = 0.374$
$r_4 = -42.497$
$\quad d_4 = 1.032 \quad n_2 = 1.69680 \quad \nu_2 = 55.52$
$r_5 = -2.358$
$\quad d_5 = 0.098$
$r_6 = 7.206$
$\quad d_6 = 1.032 \quad n_3 = 1.51728 \quad \nu_3 = 69.56$
$r_7 = -3.096$
$\quad d_7 = 0.098$
$r_8 = 2.615$
$\quad d_8 = 1.770 \quad n_4 = 1.61800 \quad \nu_4 = 63.38$
$r_9 = -1.658$
$\quad d_9 = 0.433 \quad n_5 = 1.84666 \quad \nu_5 = 23.90$
$r_{10} = -76.590$
$f = 1.0, l = 15.0, S = 0.794$
$IH = 0.885, 2\omega = 118°, \Sigma P = 0.015$
$NA = 0.0129, f_{234}/f = 1.562$ $$\left|\left(\frac{1-n_1}{r_2}\right)/\left(\frac{1-n_2}{r_5}+\frac{1-n_3}{r_7}\right)\right| = 1.380$$

wherein the reference symbols $r_1$ through $r_{10}$ represent radii of curvature on the surfaces of the respective lens elements including the stop ($r_3$), the reference symbols $d_1$ through $d_9$ designate thicknesses of the respective lens elements and airspaces reserved therebetween, the reference symbols $n_1$ through $n_5$ denote refractive indices of the respective lens elements, the reference symbol l represents distance as measured from an object to be observed or photographed to the front surface of the lens system, the reference symbol IH designates height of image, the reference symbol $2\omega$ denotes field angle, the reference symbol $\Sigma P$ represents Petzval's sum and the reference symbol NA designates numerical aperture. Inclination angles $\theta$ of the principal rays at the individual field angles of the Embodiments described above are as listed in the following table:

| Embodiment | $2\omega$ (field angle) | $\theta$ |
|---|---|---|
| Embodiment 1 | 115.84° | −4.514° |
| | 74.44° | −3.610° |
| | 51.55° | −2.733° |
| Embodiment 2 | 117.08° | 0.034° |
| | 75.60° | −0.597° |
| | 52.35° | −0.600° |
| Embodiment 3 | 115.57° | −4.383° |
| | 74.46° | −3.621° |
| | 51.56° | −2.806° |
| Embodiment 4 | 114.86° | −4.562° |
| | 74.28° | −3.724° |
| | 51.50° | −2.837° |
| Embodiment 5 | | |
| | 115.53° | 0.020° |
| | 75.114° | −0.645° |
| | 51.95° | −0.739° |
| Embodiment 6 | 115.71° | 0.032° |
| | 75.09° | −0.601° |
| | 51.946° | −0.689° |
| Embodiment 7 | 115.65° | −5.253° |
| | 74.35° | −4.103° |
| | 51.50° | −3.080° |
| Embodiment 8 | 117.85° | −4.510° |
| | 75.26° | −3.623° |
| | 52.04° | −2.749° |
| Embodiment 9 | 120.19° | −4.564° |
| | 76.35° | −3.683° |
| | 52.73° | −2.799° |
| Embodiment 10 | 117.6° | −4.141° |
| | 75.34° | −3.293° |
| | 52.16° | −2.495° |
| Embodiment 11 | 116.69° | −5.351° |
| | 74.87° | −3.963° |
| | 51.88° | −2.914° |
| Embodiment 12 | 118° | −4.5° |
| | 75.43° | −3.608° |
| | 52.2° | −2.729° |
| Embodiment 13 | 118° | −4.5° |
| | 75.2° | −3.61° |
| | 52.02° | −2.77° |
| Embodiment 14 | 118.58° | −4.57° |
| | 75.496° | −3.686° |
| | 52.168° | −2.799° |
| Embodiment 15 | 118° | −4.5° |
| | 75.1° | −3.88° |
| | 51.9° | −2.97° |

I claim:

1. An objective lens system for endoscopes comprising a first negative meniscus lens component having a concave surface on the image side, an aperture stop, a second positive meniscus lens component, a third biconvex lens component and a fourth positive cemented doublet component consisting of a positive lens element and a negative lens element, said lens system being so designed as to satisfy the following conditions:

$$n_1 \geq 1.51 \quad (1)$$
$$\nu_1 \geq 55 \quad (2)$$
$$1.4 \leq f_{234}/f \leq 1.7 \quad (3)$$

$$1.3 \leq \left|\left(\frac{1-n_1}{r_2}\right)/\left(\frac{1-n_2}{r_5}+\frac{1-n_3}{r_7}\right)\right| \leq 1.6 \quad (4)$$

$$\nu_3 \geq 60 \quad (5)$$
$$|n_4 - n_5| \geq 0.2 \quad (6)$$

wherein the reference symbol f represents total focal length of the entire lens system as a whole, the reference symbol $f_{234}$ designates total focal length of said second, third and fourth lens components as a whole, the reference symbols $r_2$, $r_5$ and $r_7$ denote radii of curvature on the image side surface of said first lens component, image side surface of said second lens component and image side surface of said third lens component, the reference symbols $n_1$ through $n_5$ represent refractive indices of the respective lens elements and the reference symbols $\nu_1$, $\nu_2$ and $\nu_3$ designate Abbe's numbers of said first, second and third lens components respectively.

2. An objective lens system for endoscopes according to claim 1 wherein said aperture stop is arranged in the vicinity of the object side focal point of said rear lens group consisting of said second, third and fourth lens components.

3. An objective lens system for endoscopes according to claim 1 having the following numerical data:

```
r1  = 40.340
      d1 = 0.509    n1 = 1.58913    ν1 = 60.97
r2  = 0.844
      d2 = 1.253
r3  = ∞
      d3 = 0.372
r4  = −35.462
      d4 = 1.067    n2 = 1.69680    ν2 = 55.52
r5  = −2.318
      d5 = 0.124
r6  = 9.484
      d6 = 1.129    n3 = 1.51728    ν3 = 69.56
r7  = −2.955
      d7 = 0.124
r8  = 2.782
      d8 = 1.948    n4 = 1.61800    ν4 = 63.38
r9  = −1.608
      d9 = 0.434    n5 = 1.84666    ν5 = 23.90
r10 = −49.305
f = 1.0, l = 15.0, S = 0.81
IH = 0.881  2ω = 115.84°, ΣP = −0.014
NA = 0.0129, f234/f = 1.614
```

$$\left| \left( \frac{1-n_1}{r_2} \right) / \left( \frac{1-n_2}{r_5} + \frac{1-n_3}{r_7} \right) \right| = 1.467$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol l designates distance as measured from an object to be observed or photographed to the front surface of the lens system, the reference symbol S denotes distance as measured from the rear surface of the lens system to the image, reference symbols IH represents height of the image, the reference symbol $2\omega$ designates field angle, the reference symbol $\Sigma P$ denotes Petzval's sum and the reference symbol NA represents numerical aperture.

4. An objective lens system for endoscopes according to claim 1 having the following numerical data:

```
r1  = 20.6504
      d1 = 0.5001   n1 = 1.58913    ν1 = 60.97
r2  = 0.8479
      d2 = 1.2476
r3  = ∞
      d3 = 0.3770
r4  = −63.1598
      d4 = 1.0635   n2 = 1.69680    ν2 = 55.52
r5  = −2.4379
      d5 = 0.1251
r6  = 7.2310
      d6 = 1.1253   n3 = 1.51728    ν3 = 69.56
r7  = −3.0381
      d7 = 0.1255
r8  = 2.6453
      d8 = 1.8743   n4 = 1.61800    ν4 = 63.38
r9  = −1.6289
      d9 = 0.4375   n5 = 1.84666    ν5 = 23.90
r10 = −812.0951
f = 1.0, l = 15.0, S = 0.773
IH = 0.881, 2ω = 115.57°, ΣP = 0
NA = 0.0129, f234/f = 1.587
```

$$\left| \left( \frac{1-n_1}{r_2} \right) / \left( \frac{1-n_2}{r_5} + \frac{1-n_3}{r_7} \right) \right| = 1.523$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol l designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

5. An objective lens system for endoscopes according to claim 1 having the following numerical data:

```
r1  = 21.3790
      d1 = 0.5062   n1 = 1.58913    ν1 = 60.97
r2  = 0.8417
      d2 = 1.2469
r3  = ∞
      d3 = 0.3704
r4  = −35.9354
      d4 = 1.0617   n2 = 1.69680    ν2 = 55.52
r5  = −2.2956
      d5 = 0.1246
r6  = 8.7810
      d6 = 1.1235   n3 = 1.51728    ν3 = 69.56
r7  = −3.0240
      d7 = 0.1235
r8  = 2.6730
      d8 = 1.8765   n4 = 1.61800    ν4 = 63.38
r9  = −1.6290
      d9 = 0.4321   n5 = 1.84666    ν5 = 23.90
r10 = −206.3722
f = 1.0, l = 15.0, S = 0.794
IH = 0.881, 2ω = 114.86°, ΣP = −0.006
NA = 0.0129, f234/f = 1.589
```

$$\left| \left( \frac{1-n_1}{r_2} \right) / \left( \frac{1-n_2}{r_5} + \frac{1-n_3}{r_7} \right) \right| = 1.475$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $v_1$ through $v_5$ represent Abbe's numbers of the respective lens elements, the reference symbol 1 designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

6. An objective lens system for endoscopes according to claim 1 having the following numerical data:

$r_1 = 17.6741$
  $d_1 = 0.4938$   $n_1 = 1.58913$   $v_1 = 60.97$
$r_2 = 0.8373$
  $d_2 = 0.9877$
$r_3 = \infty$
  $d_3 = 0.6173$
$r_4 = -36.3478$
  $d_4 = 1.0494$   $n_2 = 1.69680$   $v_2 = 55.52$
$r_5 = -2.4411$
  $d_5 = 0.1246$
$r_6 = 6.5303$
  $d_6 = 1.0864$   $n_3 = 1.48749$   $v_3 = 70.15$
$r_7 = -2.8037$
  $d_7 = 0.1235$
$r_8 = 2.5290$
  $d_8 = 1.7284$   $n_4 = 1.61800$   $v_4 = 63.38$
$r_9 = -1.5909$
  $d_9 = 0.4321$   $n_5 = 1.84666$   $v_5 = 23.90$
$r_{10} = 89.7642$
$f = 1.0, 1 = 15.0, S = 0.863$
$IH = 0.881, 2\omega = 115.53°, \Sigma P = 0$
$NA = 0.0129, f_{234}/f = 1.574$ $$\left| \left( \frac{1-n_1}{r_2} \right) \bigg/ \left( \frac{1-n_2}{r_5} + \frac{1-n_3}{r_7} \right) \right| = 1.532$$

wherein reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $v_1$ through $v_5$ represent Abbe's numbers of the respective lens elements, the reference symbol 1 designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

7. An objective lens system for endoscopes according to claim 1 having the following numerical data:

$r_1 = 20.3968$
  $d_1 = 0.4938$   $n_1 = 1.58913$   $v_1 = 60.97$
$r_2 = 0.8374$
  $d_2 = 0.9877$
$r_3 = \infty$
  $d_3 = 0.6173$
$r_4 = -62.3951$
  $d_4 = 1.0494$   $n_2 = 1.6968$   $v_2 = 55.52$
$r_5 = -2.4077$
  $d_5 = 0.1235$
$r_6 = 7.1414$
  $d_6 = 1.1110$   $n_3 = 1.51728$   $v_3 = 69.56$
$r_7 = -3.0005$
  $d_7 = 0.1236$
$r_8 = 2.6126$
  $d_8 = 1.7284$   $n_4 = 1.61800$   $v_4 = 63.38$
$r_9 = -1.6088$
  $d_9 = 0.4321$   $n_5 = 1.84666$   $v_5 = 23.90$
$r_{10} = -796.822$
$f = 1, 1 = 15.0, S = 0.863$
$IH = 0.881, 2\omega = 115.71°, \Sigma P = 0$
$NA = 0.013, f_{234}/f = 1.584$ $$\left| \left( \frac{1-n_1}{r_2} \right) \bigg/ \left( \frac{1-n_2}{r_5} + \frac{1-n_3}{r_7} \right) \right| = 1.523$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $v_1$ through $v_5$ represent Abbe's numbers of the respective lens elements, the reference symbol 1 designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

8. An objective lens system for endoscopes according to claim 1 having the following numerical data:

$r_1 = 46.5568$
  $d_1 = 0.5043$   $n_1 = 1.58913$   $v_1 = 60.97$
$r_2 = 0.8358$
  $d_2 = 1.2423$
$r_3 = \infty$
  $d_3 = 0.3690$
$r_4 = -39.4208$
  $d_4 = 1.0578$   $n_2 = 1.6968$   $v_2 = 55.52$
$r_5 = -2.2932$
  $d_5 = 0.1230$
$r_6 = 8.9076$
  $d_6 = 1.1193$   $n_3 = 1.5728$   $v_3 = 69.56$
$r_7 = -2.9702$
  $d_7 = 0.1230$
$r_8 = 2.7349$
  $d_8 = 1.8696$   $n_4 = 1.61800$   $v_4 = 63.38$
$r_9 = -1.5664$
  $d_9 = 0.4305$   $n_5 = 1.84666$   $v_5 = 23.90$
$r_{10} = -363.0739$
$f = 1.0, 1 = 15.0, S = 0.838$
$IH = 0.881, 2\omega = 115.646°, \Sigma P = -0.022$
$NA = 0.0129, f_{234}/f = 1.53$ $$\left| \left( \frac{1-n_1}{r_2} \right) \bigg/ \left( \frac{1-n_2}{r_5} + \frac{1-n_3}{r_7} \right) \right| = 1.419$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol l designates distance as measured from an object to be observed or photographed to the front surface of the lens system, the reference symbol S denotes distance as measured from the rear surface of the lens system to the image, the reference sybmol IH represents height of the image, the reference symbol $2\omega$ designates field angle, the reference symbol $\Sigma P$ denotes Petzval's sum and the reference symbol NA represents numerical aperture.

9. An objective lens system for endoscopes according to claim 1 having the following numerical data:

$r_1 = 75.582$
  $d_1 = 0.523$   $n_1 = 1.58913$   $\nu_1 = 60.97$
$r_2 = 0.872$
  $d_2 = 1.264$
$r_3 = \infty$
  $d_3 = 0.376$
$r_4 = -31.949$
  $d_4 = 1.076$   $n_2 = 1.69680$   $\nu_2 = 55.52$
$r_5 = -2.309$
  $d_5 = 0.125$
$r_6 = 10.102$
  $d_6 = 1.139$   $n_3 = 1.51728$   $\nu_3 = 69.56$
$r_7 = -2.963$
  $d_7 = 0.125$
$r_8 = 2.737$
  $d_8 = 1.965$   $n_4 = 1.6180$   $\nu_4 = 63.38$
$r_9 = -1.602$
  $d_9 = 0.439$   $n_5 = 1.84666$   $\nu_5 = 23.90$
$r_{10} = -72.703$
  $f = 1.0$,   $l = 15.0$,   $S = 0.78$
  $IH = 0.888$,   $2\omega = 117.85°$,   $\Sigma P = -0.009$
  $NA = 0.0132$,   $f_{234}/f = 1.563$ $$\left| \left( \frac{1 - n_1}{r_2} \right) \Big/ \left( \frac{1 - n_2}{r_5} + \frac{1 - n_3}{r_7} \right) \right| = 1.418$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol l designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

10. An objective lens system for endoscopes according to claim 1 having the following numerical data:

$r_1 = 76.346$
  $d_1 = 0.5277$   $n_1 = 1.58913$   $\nu_1 = 60.97$
$r_2 = 0.880$
  $d_2 = 1.2771$
$r_3 = \infty$
  $d_3 = 0.38$
$r_4 = -31.030$
  $d_4 = 1.0872$   $n_2 = 1.670$   $\nu_2 = 57.33$
$r_5 = -2.242$
  $d_5 = 0.1010$
$r_6 = 10.204$
  $d_6 = 1.1505$   $n_3 = 1.51728$   $\nu_3 = 69.56$
$r_7 = -2.993$
  $d_7 = 0.1010$
$r_8 = 2.764$
  $d_8 = 2.0202$   $n_4 = 1.618$   $\nu_4 = 63.38$
$r_9 = -1.618$
  $d_9 = 0.4433$   $n_5 = 1.84666$   $\nu_5 = 23.90$
$r_{10} = -73.4376$
  $f = 1.0$,   $l = 15.0$,   $S = 0.762$
  $IH = 0.899$,   $2\omega = 120.19°$,   $\Sigma P = -0.006$
  $NA = 0.013$,   $f_{234}/f = 1.612$ $$\left| \left( \frac{1 - n_1}{r_2} \right) \Big/ \left( \frac{1 - n_2}{r_5} + \frac{1 - n_3}{r_7} \right) \right| = 1.419$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol l designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

11. An objective lens system for endoscopes according to claim 1 having the following numerical data:

$r_1 = 75.582$
  $d_1 = 0.523$   $n_1 = 1.58913$   $\nu_1 = 60.97$
$r_2 = 0.872$
  $d_2 = 1.264$
$r_3 = \infty$
  $d_3 = 0.376$
$r_4 = -31.949$
  $d_4 = 1.076$   $n_2 = 1.6968$   $\nu_2 = 55.52$
$r_5 = -2.309$
  $d_5 = 0.125$
$r_6 = 10.102$
  $d_6 = 1.139$   $n_3 = 1.51728$   $\nu_3 = 69.56$
$r_7 = -2.963$
  $d_7 = 0.125$
$r_8 = 3.074$
  $d_8 = 1.965$   $n_4 = 1.69249$   $\nu_4 = 58.56$
$r_9 = -1.602$
  $d_9 = 0.439$   $n_5 = 1.92286$   $\nu_5 = 21.29$
$r_{10} = -36.333$
  $f = 1.0$,   $l = 15.0$,   $S = 0.853$
  $IH = 0.89$,   $2\omega = 117.6°$,   $\Sigma P = -0.005$
  $NA = 0.0129$,   $f_{234}/f = 1.583$ $$\left| \left( \frac{1 - n_1}{r_2} \right) \Big/ \left( \frac{1 - n_2}{r_5} + \frac{1 - n_3}{r_7} \right) \right| = 1.418$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol l designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

12. An objective lens system for endoscopes according to claim 1 having the following numerical data:

| | | | |
|---|---|---|---|
| $r_1 =$ | 39.261 | | |
| | $d_1 = 0.45$ | $n_1 = 1.58913$ | $\nu_1 = 60.97$ |
| $r_2 =$ | 0.834 | | |
| | $d_2 = 1.28$ | | |
| $r_3 =$ | $\infty$ | | |
| | $d_3 = 0.38$ | | |
| $r_4 =$ | $-33.554$ | | |
| | $d_4 = 1.05$ | $n_2 = 1.6968$ | $\nu_2 = 55.52$ |
| $r_5 =$ | $-2.325$ | | |
| | $d_5 = 0.1$ | | |
| $r_6 =$ | 10.771 | | |
| | $d_6 = 1.06$ | $n_3 = 1.51728$ | $\nu_3 = 69.56$ |
| $r_7 =$ | $-2.962$ | | |
| | $d_7 = 0.1$ | | |
| $r_8 =$ | 2.907 | | |
| | $d_8 = 1.85$ | $n_4 = 1.6180$ | $\nu_4 = 63.38$ |
| $r_9 =$ | $-1.659$ | | |
| | $d_9 = 0.44$ | $n_5 = 1.84666$ | $\nu_5 = 23.90$ |
| $r_{10} =$ | $-22.0281$ | | |
| | $f = 1.0,$ | $l = 15.0,$ | $S = 0.986$ |
| | $IH = 0.9,$ | $2\omega = 118°,$ | $\Sigma P = -0.018$ |
| | $NA = 0.0133,$ | $f_{234}/f = 1.651$ | |

$$\left| \left( \frac{1-n_1}{r_2} \right) / \left( \frac{1-n_2}{r_5} + \frac{1-n_3}{r_7} \right) \right| = 1.489$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol l designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

13. An objective lens system for endoscopes according to claim 1 having the following numerical data:

| | | | |
|---|---|---|---|
| $r_1 =$ | 53.309 | | |
| | $d_1 = 0.444$ | $n_1 = 1.58913$ | $\nu_1 = 60.97$ |
| $r_2 =$ | 0.833 | | |
| | $d_2 = 1.262$ | | |
| $r_3 =$ | $\infty$ | | |
| | $d_3 = 0.375$ | | |
| $r_4 =$ | $-31.892$ | | |
| | $d_4 = 1.036$ | $n_2 = 1.6968$ | $\nu_2 = 55.52$ |
| $r_5 =$ | $-2.305$ | | |
| | $d_5 = 0.099$ | | |
| $r_6 =$ | 10.489 | | |
| | $d_6 = 1.045$ | $n_3 = 1.51728$ | $\nu_3 = 69.56$ |
| $r_7 =$ | $-2.934$ | | |
| | $d_7 = 0.099$ | | |
| $r_8 =$ | 2.852 | | |
| | $d_8 = 1.825$ | $n_4 = 1.6180$ | $\nu_4 = 63.38$ |
| $r_9 =$ | $-1.638$ | | |
| | $d_9 = 0.434$ | $n_5 = 1.84666$ | $\nu_5 = 23.90$ |
| $r_{10} =$ | $-22.031$ | | |
| | $f = 1.0, l = 15.0, S = 0.974$ | | |
| | $IH = 0.89, 2\omega = 118.0°, \Sigma P = -0.016$ | | |
| | $NA = 0.0129, f_{234}/f = 1.630$ | | |

$$\left| \left( \frac{1-n_1}{r_2} \right) / \left( \frac{1-n_2}{r_5} + \frac{1-n_3}{r_7} \right) \right| = 1.478$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol l designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

14. An objective lens system for endoscopes according to claim 1 having the following numerical data:

| | | | |
|---|---|---|---|
| $r_1 =$ | 87.350 | | |
| | $d_1 = 0.523$ | $n_1 = 1.58913$ | $\nu_1 = 60.97$ |
| $r_2 =$ | 0.871 | | |
| | $d_2 = 1.264$ | | |
| $r_3 =$ | $\infty$ | | |
| | $d_3 = 0.376$ | | |
| $r_4 =$ | $-34.593$ | | |
| | $d_4 = 1.076$ | $n_2 = 1.6968$ | $\nu_2 = 55.52$ |
| $r_5 =$ | $-2.281$ | | |
| | $d_5 = 0.125$ | | |
| $r_6 =$ | 11.081 | | |
| | $d_6 = 1.080$ | $n_3 = 1.48749$ | $\nu_3 = 70.15$ |
| $r_7 =$ | $-2.839$ | | |
| | $d_7 = 0.120$ | | |
| $r_8 =$ | 2.693 | | |
| | $d_8 = 1.965$ | $n_4 = 1.6180$ | $\nu_4 = 63.38$ |
| $r_9 =$ | $-1.604$ | | |
| | $d_9 = 0.439$ | $n_5 = 1.84666$ | $\nu_5 = 23.90$ |
| $r_{10} =$ | $-62.149$ | | |
| | $f = 1.0, l = 15.0, S = 0.794$ | | |
| | $IH = 0.89, 2\omega = 118.58°, \Sigma P = -0.007$ | | |
| | $NA = 0.0127, f_{234}/f = 1.610$ | | |

$$\left| \left( \frac{1-n_1}{r_2} \right) / \left( \frac{1-n_2}{r_5} + \frac{1-n_3}{r_7} \right) \right| = 1.420$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol 1 designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

15. An objective lens system for endoscopes according to claim 1 having the following numerical data:

| | | | |
|---|---|---|---|
| $r_1 = 42.483$ | | | |
| | $d_1 = 0.423$ | $n_1 = 1.51633$ | $\nu_1 = 64.15$ |
| $r_2 = 0.809$ | | | |
| | $d_2 = 1.259$ | | |
| $r_3 = \infty$ | | | |
| | $d_3 = 0.374$ | | |
| $r_4 = -42.497$ | | | |
| | $d_4 = 1.032$ | $n_2 = 1.69680$ | $\nu_2 = 55.52$ |
| $r_5 = -2.358$ | | | |
| | $d_5 = 0.098$ | | |
| $r_6 = 7.206$ | | | |
| | $d_6 = 1.032$ | $n_3 = 1.51728$ | $\nu_3 = 69.56$ |
| $r_7 = -3.096$ | | | |
| | $d_7 = 0.098$ | | |
| $r_8 = 2.615$ | | | |
| | $d_8 = 1.770$ | $n_4 = 1.61800$ | $\nu_4 = 63.38$ |
| $r_9 = -1.658$ | | | |
| | $d_9 = 0.433$ | $n_5 = 1.84666$ | $\nu_5 = 23.90$ |
| $r_{10} = -76.590$ | | | |
| $f = 1.0, \ l = 15.0, \ S = 0.794$ | | | |
| $IH = 0.885, \ 2\omega = 118°, \ \Sigma P = 0.015$ | | | |
| $NA = 0.0129, \ f_{234}/f = 1.562$ | | | |

$$\left| \left( \frac{1-n_1}{r_2} \right) / \left( \frac{1-n_2}{r_5} + \frac{1-n_3}{r_7} \right) \right| = 1.380$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol 1 designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum and the reference symbol NA represents numerical aperture.

16. An objective lens system for endoscopes comprising a first negative meniscus lens component having a concave surface on the image side, an aperture stop, a second positive meniscus lens component, a third biconvex lens component and a fourth positive cemented doublet component consisting of a positive lens element and a negative lens element, said lens system having the following numerical data:

| | | | |
|---|---|---|---|
| $r_1 = 28.7611$ | | | |
| | $d_1 = 0.4938$ | $n_1 = 1.58913$ | $\nu_1 = 60.97$ |
| $r_2 = 0.8457$ | | | |
| | $d_2 = 0.9877$ | | |
| $r_3 = \infty$ | | | |
| | $d_3 = 0.6173$ | | |
| $r_4 = -99.2330$ | | | |
| | $d_4 = 1.0494$ | $n_2 = 1.6968$ | $\nu_2 = 55.52$ |
| $r_5 = -2.1786$ | | | |
| | $d_5 = 0.1235$ | | |
| $r_6 = 9.2568$ | | | |
| | $d_6 = 1.1111$ | $n_3 = 1.6968$ | $\nu_3 = 55.52$ |
| $r_7 = -4.4531$ | | | |
| | $d_7 = 0.1235$ | | |
| $r_8 = 3.0441$ | | | |
| | $d_8 = 1.7284$ | $n_4 = 1.6180$ | $\nu_4 = 63.38$ |
| $r_9 = -1.6506$ | | | |
| | $d_9 = 0.4321$ | $n_5 = 1.84666$ | $\nu_5 = 23.90$ |
| $r_{10} = -18.0296$ | | | |
| $f = 1.0, \ l = 15.0, \ S = 0.863$ | | | |
| $IH = 0.889, \ 2\omega = 117.08°, \ \Sigma P = 0$ | | | |
| $NA = 0.0129, \ f_{234}/f = 1.591$ | | | |

$$\left| \left( \frac{1-n_1}{r_2} \right) / \left( \frac{1-n_2}{r_5} + \frac{1-n_3}{r_7} \right) \right| = 1.463$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol 1 designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum, the reference sumbol NA represents numerical aperture, the reference symbol f represents total focal length of the entire lens system as a whole, and the reference symbol $f_{234}$ designates total focal length of said second, third and fourth lens components as a whole.

17. An objective lens system for endoscopes comprising a first negative meniscus lens component having a concave surface on the image side, an aperture stop, a second positive meniscus lens component, a third biconvex lens component and a fourth positive cemented doublet component consisting of a positive lens element and a negative lens element, said lens system having the following numerical data:

| | | | |
|---|---|---|---|
| $r_1 = 80.059$ | | | |
| | $d_1 = 0.523$ | $n_1 = 1.726$ | $\nu_1 = 53.56$ |
| $r_2 = 0.945$ | | | |
| | $d_2 = 1.264$ | | |
| $r_3 = \infty$ | | | |
| | $d_3 = 0.376$ | | |
| $r_4 = -30.452$ | | | |
| | $d_4 = 1.076$ | $n_2 = 1.6968$ | $\nu_2 = 55.52$ |
| $r_5 = -2.227$ | | | |
| | $d_5 = 0.126$ | | |
| $r_6 = 12.588$ | | | |
| | $d_6 = 1.139$ | $n_3 = 1.51728$ | $\nu_3 = 69.56$ |
| $r_7 = -2.878$ | | | |
| | $d_7 = 0.126$ | | |
| $r_8 = 3.426$ | | | |
| | $d_8 = 1.965$ | $n_4 = 1.69249$ | $\nu_4 = 58.56$ |
| $r_9 = -1.557$ | | | |

-continued

|  | $d_9 = 0.439$ | $n_5 = 1.92286$ | $\nu_5 = 21.29$ |
|---|---|---|---|
| $r_{10} = -36.333$ | | | |
| | $f = 1.0,$ | $l = 15.0,$ | $S = 1.05$ |
| | $IH = 0.89,$ | $2\omega = 116.69°,$ | $\Sigma P = -0.036$ |
| | $NA = 0.0128,$ | $f_{234}/f = 1.666$ | |

$$\left| \left( \frac{1-n_1}{r_2} \right) \Big/ \left( \frac{1-n_2}{r_5} + \frac{1-n_3}{r_7} \right) \right| = 1.560$$

wherein the reference symbols $r_1$ through $r_{10}$ represent radii of curvature on the surfaces of the respective lens elements including said stop, the reference symbols $d_1$ through $d_9$ designate thicknesses of the respective lens elements and airspaces reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol 1 designates distance as measured from an object to be observed or photographed to the front surface of the lens system, the reference symbol S denotes distance as measured from the rear surface of the lens system to the image, the reference symbol IH represents height of the image, the reference symbol $2\omega$ designates field angle, the reference symbol $\Sigma P$ denotes Petzval's sum, the reference symbol NA represents numerical aperture, the reference symbol f represents total focal length of the entire lens system as a whole, and the reference symbol $f_{234}$ designates total focal length of said second, third and fourth lens components as a whole.

* * * * *